United States Patent [19]
Beck et al.

[11] Patent Number: 5,853,323
[45] Date of Patent: Dec. 29, 1998

[54] HEATING OR AIR CONDITIONING UNIT

[75] Inventors: Oliver Beck, Sindelfingen-Hinterweil; Ralf Berndt; Walter Denk, both of Ditzingen; Hans Juergen Drobner, Leonberg; Manfred Fuchs, Stuttgart; Gabriele Herbold, Marbach; Ingo Putz, Stuttgart; Reinhold Schork, Eberbach; Thomas Spranger, Stuttgart; Walter Ullrich, Moeglingen, all of Germany

[73] Assignee: Behr GmbH & Co., Stuttgart, Germany

[21] Appl. No.: 957,775

[22] Filed: Oct. 24, 1997

[30] Foreign Application Priority Data

Oct. 24, 1996 [DE] Germany ............... 196 44 159.5

[51] Int. Cl.⁶ .................................. B60H 1/00
[52] U.S. Cl. .................. 454/156; 454/69; 137/454.2; 137/883
[58] Field of Search ............ 454/69, 121, 156, 454/159, 160, 161; 137/872, 883, 305, 454.2

[56] References Cited

U.S. PATENT DOCUMENTS 3,334,704  8/1967  Gehrke et al. ............... 180/68
4,726,823  2/1988  Brice ................... 454/158 X
5,337,705  8/1994  Lane .................... 123/41.33

FOREIGN PATENT DOCUMENTS

| 2 255 473 | 7/1975 | France . |
| 1 910 782 | 12/1964 | Germany . |
| 6604786 | 2/1965 | Germany . |
| 24 59 295 | 7/1975 | Germany . |
| 39 22 814 | 4/1990 | Germany . |
| 39 13 100 | 10/1990 | Germany . |
| 60-193713 | 10/1985 | Japan ................... 454/159 |
| 2 189 292 | 10/1987 | United Kingdom . |
| WO/81/01327 | 5/1981 | WIPO . |

OTHER PUBLICATIONS

56–121817, Mar. 1980, Patents Abstracts of Japan, M–104, Dec. 26, 1981, vol. 5/No. 20.

56–159513, May 1980, Patents Abstracts of Japan, M–118, Mar. 20, 1982, vol. 6/No. 45.

2–233129, Feb. 1990, Patents Abstracts of Japan, M–1199, Jan. 12, 1992, Vo.. 16/No. 10.

*Primary Examiner*—Harold Joyce
*Attorney, Agent, or Firm*—Foley & Lardner

[57] ABSTRACT

A heating or air conditioning unit for the interior of a motor vehicle including installation frames having louvers being inserted into a receptacle of the housing provided for that purpose. The installation frame has a profile on its frame sides so that the installation frame is held in a positive-locking manner in a receptacle of the housing. The profile has a wedge-shaped structure, thin ribs extending, running apart, along a frame side in the insertion direction.

17 Claims, 3 Drawing Sheets

HEATING OR AIR CONDITIONING UNIT

BACKGROUND OF THE INVENTION

1. Field of the Invention

The invention relates to a heating or air conditioning unit for use in a motor vehicle having an installation frame supporting air control elements, e.g. louvers, and inserted into a receptacle for housing the air control elements.

2. Description of the Related Art

An installation frame is known from DE 44 42 000 A1, which has a plurality of louvers supported therein and which is inserted into a housing receptacle.

SUMMARY OF THE INVENTION

An object of the present invention is to provide a heating or air conditioning unit having an installation frame provided with louvers which is simply and securely inserted in a housing receptacle.

According to the present invention, an installation frame has a profile on at least one side of the installation frame which corresponds to the profile of a housing receptacle receiving the installation frame. The corresponding profiles ensure the installation frame is simply and securely inserted into the housing receptacle. Further, the corresponding profiles cause the clamping force to act transversely to the longitudinal axis of the installation frame side when it is inserted into the housing receptacle. This increases the rigidity of the installation frame without creating any disturbing forces impeding the action of the louvers supported by the installation frame. This ensures that the louvers can be turned with little effort.

In another embodiment of the invention, the corresponding profiles are wedge-shaped such that, at the start of the insertion operation, a protrusion of the installation frame is aligned with a corresponding depression in the receptacle, or vice versa. Subsequent relative movement between the installation frame and the receptacle frame results in a secure fit.

In yet another embodiment of the invention, the installation frame has profiles on all four frame sides such that it can be inserted from either of two perpendicular directions into the housing receptacle. The opposite frame sides are advantageously provided with mutually complementary profiles to avoid incorrect insertion of the installation frame.

Ribs on the installation frame may also be coated with an elastic material to more effectively seal the corresponding profile with respect to the housing receptacle. Preferably, the coating would be an elastomer.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

DETAILED DESCRIPTION OF PREFERRED EMBODIMENTS

Figure 1:
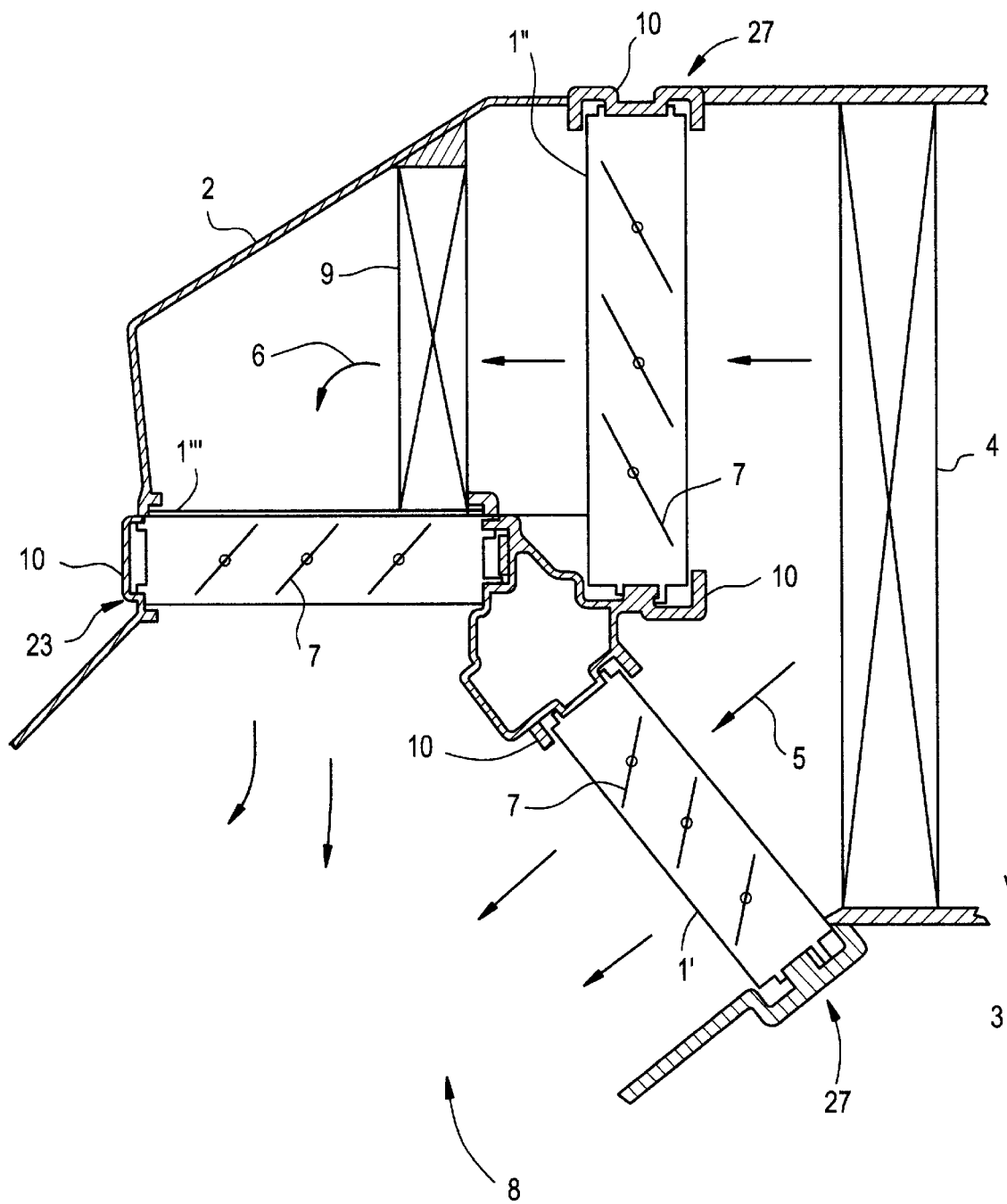
FIG. 1 is a partial longitudinal section of an air conditioning unit housing having installation frames according to the present invention inserted into receptacles circumscribing the installation frames.

The partial longitudinal section of a heating or air conditioning unit for a vehicle shown in FIG. 1 has three installation frames $1', 1'', 1'''$ arranged inside a housing 2 of the heating or air conditioning unit. The housing 2 has an inlet opening 3 through which an air stream flows with the aid of a fan (not shown). The inlet air passes through an evaporator 4, and is then divided into a cold air stream 5 and a hot air stream 6, which are conducted through different ducts. Depending on the position of the air control louvers 7 of the installation frames $1', 1'', 1'''$, one or both of the cold air stream 5 and the hot air stream 6 are conducted to an outlet opening 8 supplying conditioned air to vents (not shown) leading to the vehicle interior. When louvers 7 of the installation frame $1'$ are in an open position, the cold air stream 5 is conducted directly to the outlet opening 8. When louvers 7 of the installation frames $1'', 1'''$ are in an open position, the hot air stream 6 is heated by a heater 9 arranged between the installation frames $1''$ and $1'''$, and then conducted to the outlet opening 8. To fix the position of the installation frames $1', 1'', 1'''$, the housing 2 has receptacles 10 in which the installation frames $1', 1'', 1'''$ are held in a positive-locking manner.

Figure 2:
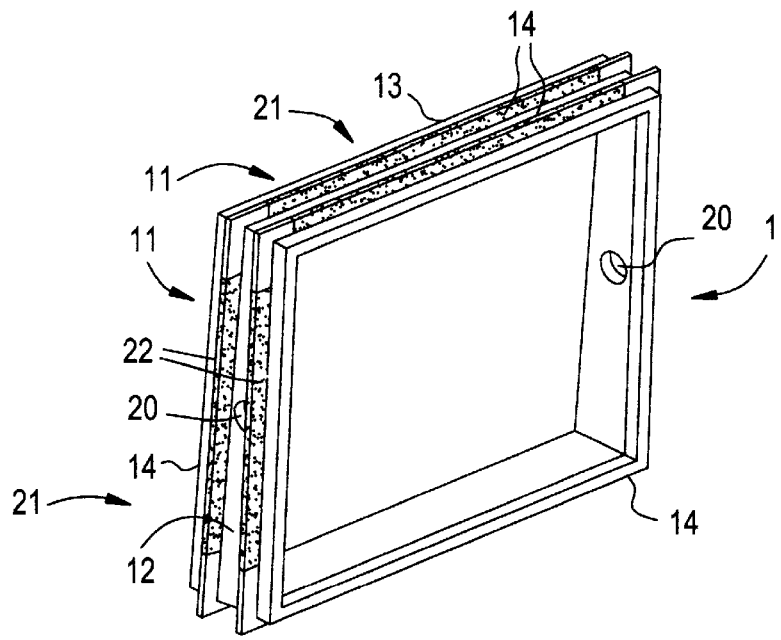
FIG. 2 is a perspective view of an installation frame according to the present invention.

As seen in FIG. 2, the frame sides 11 of installation frame 1 have selected profiles. The profiles of a first, relatively shorter, side 12 and a second, relatively longer, side 13 of the installation frame 1 each include two ribs 14 converging toward one another in a wedge shape. The installation frame 1 can be inserted into the corresponding receptacle 10 of the housing 2 in only one direction because of the wedge-shaped configuration of the ribs 14. The insertion direction of the installation frame 1 illustrated in FIG. 2, due to the profile of the first side 12, for example, would be downward, i.e., from the top toward the bottom, with contact in the receptacle 10. The profile structure of the longitudinal side 13 additionally allows the installation frame 1 to be inserted in a direction which is offset by 90°, so that, depending on the shape of the housing 2, the installation frames 1 can be inserted into a corresponding receptacle 10 from either of two different directions.

The installation frame 1 illustrated in FIG. 2 is of essentially rectangular design. Although the first side 12 is shown as being shorter than the second side 13, the first side 12 may also be longer than or the same size as the second side. Preferably there are three louvers 7 arranged inside the installation frame 1 and connected through an opening 20 on the first sides 12 to an actuator (not shown) for turning the louvers 7. The actuator may be designed, for example, as a stepping motor. As shown in FIG. 2, the installation frame 1 has two ribs 14 on each frame side 11 converging toward one another in a wedge shape. Alternatively, a frame side 11 may have only one rib 14 extending obliquely with respect to the longitudinal axis of the frame side 11. Each rib 14 may have a coating 22 of an elastic plastic material, preferably an elastomer, in a central region 21. The coating 22 improves the seal between the installation frame 1 and the receptacle 10.

Figure 3:
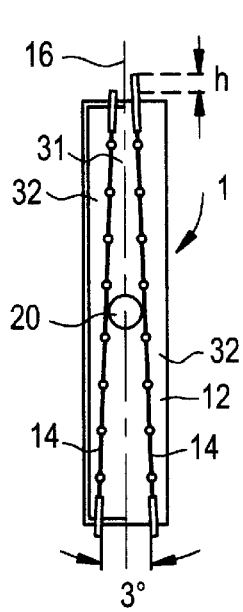
FIG. 3 is a side view of an installation frame according to the present invention.

As illustrated in FIG. 3, the ribs 14 run essentially symmetrically relative to a longitudinal axis 16 of the first side 12. In the upper corner region of the installation frame 1, the right-hand rib 14 protrudes beyond the left-hand rib 14 by a distance h. The length difference h between the two ribs 14 is present in at least one corner region of the installation frame 1 so that the correct orientation for the installation frame 1 may be recognized quickly when inserting the installation frame 1 into the receptacle 10. Alternatively, one rib 14 may extend a uniform height above the side 11 more or less than that of the adjacent rib 14 over the entire length of the frame side 11.

Figure 4:
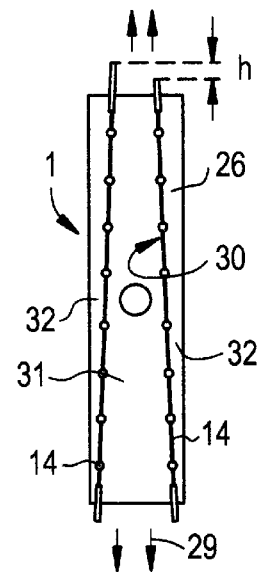
FIG. 4 is an opposite side view of the installation frame shown in FIG. 3.

FIGS. 3 and 4 show the two opposite first sides 12 of the installation frame 1 according to an alternate embodiment of the installation frame. Each of the opposite first sides 12 has ribs 14 running toward one another in a wedge shape; however, the spacing between the ribs differs on the opposite sides 12. The spacing between the ribs 14 is less along the narrow side 12 shown in FIG. 3 than the spacing between the ribs 14 shown in FIG. 4. The different spacing between the ribs 14 prevents the installation frame 1 from being inserted into the receptacle 10 in a laterally inverted manner, thus ensuring that the louvers 7 mounted in the installation frame 1 will open and close in the desired direction. The angle formed by the two ribs is preferably about 3°.

Figure 6:
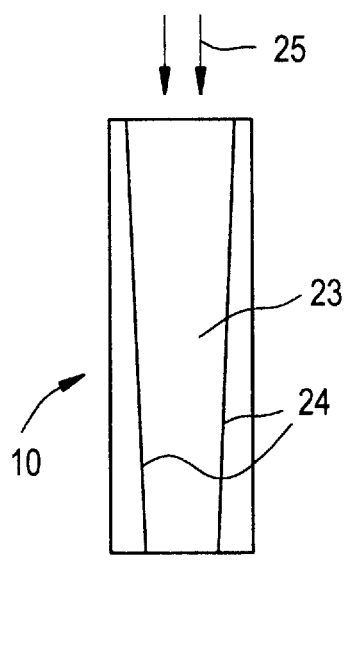
FIG. 6 is a front view of a first housing receptacle.

According to the invention, the receptacle 10 shown in FIG. 6 has a central depression 23 with side flanks 24 converging toward one another in a wedge shape in the insertion direction. As an example, the profile of the first side 12 of the installation frame 1 shown in FIG. 4 corresponds to the design of the receptacle 10 shown in FIG. 6. The installation frame 1 would be inserted into the receptacle 10 in the direction of the arrows 25 such that the outer sides 26 of the ribs 14 will come into contact with the side flanks 24.

Figure 7:
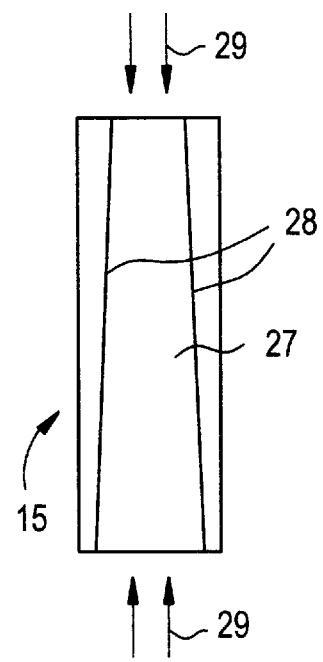
FIG. 7 is a front view of a second housing receptacle.

In an alternate embodiment of the present invention shown in FIG. 7, the receptacle 10 has a central protrusion 27 with side flanks 28 converging toward one another in a wedge shape running counter to the insertion direction. The receptacle 10 of FIG. 7 also corresponds to the same first side 12 of the installation frame 1 illustrated in FIG. 4; however, the receptacle 10 of FIG. 7 holds the ribs 14 of the first side 12 in a compressive manner. To achieve this purpose, the first side 12 of the installation frame 1, as shown in FIG. 4, is inserted in the direction of arrows 29. The inner sides 30 of the ribs 14 of installation frame 1 contact the side flanks 28 of the receptacle 10.

An advantage of the present invention is obtained when two halves of the receptacle housing 10 are combined together to form the air conditioning unit. The installation frames 1 can be mated with either half of the receptacle housing 10 according to one of the embodiments illustrated in FIGS. 6 and 7, and the other half of the receptacle housing 10 can be mated to the installation frames 1 according to other of the embodiments illustrated in FIGS. 6 and 7. Thereby it is ensured that the installation frames 1 will be inserted in the laterally correct manner, and the louvers 7 will be assured of having the same orientation. The louvers 7 will therefore open over the entire length of the housing in the same direction. The complementary design of the receptacles 10 thus enables the installation frames to be inserted in the opposite directions 25,29 with respect to the two halves of the receptacle housing 10 without the installation frame 1 having to be turned.

Figure 5:
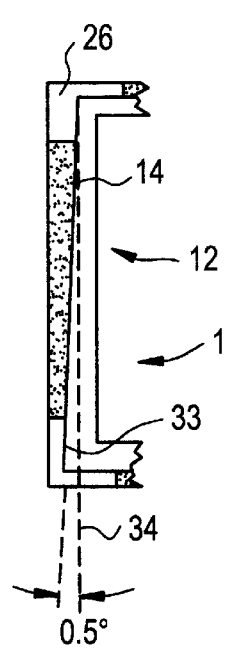
FIG. 5 is a partial front view of a side region of an installation frame according to the present invention.

To improve the insertion operation, both the inner frame surfaces 31 and outer frame surfaces 32 of the frame side 11 may have sloping surfaces 33 whose height decreases in the insertion direction. As seen in FIG. 5, the outer frame surface 32 has sloping surfaces 33 whose height increases as the ribs 14 diverge. The angle of the sloping surfaces 33 in relation to a vertical plane 34, i.e., the grade, is about 0.5°. The sloping surface 33 of the inner frame surface 31 rises in the opposite direction, that is, the height of the sloping surfaces 33 of the inner surface 31 decreases as the ribs 14 diverge. Corresponding to the sloping surfaces 33 of the inner and outer frame surfaces 31,32 of the installation frame 1, the corresponding side flanks 24,28 of the receptacle 10 have a greater height in the insertion direction, so that a sealed and firm fit of the installation frame 1 inside the receptacle 10 is ensured.

The invention is not restricted to the aforementioned example of two ribs for each frame side. Alternatively, one frame side may also have only one rib running obliquely. It is also envisioned that profiling of only two frame sides may be sufficient for secure mounting of the installation frame inside the housing.

Ensuring proper orientation of the installation frame 1 is achieved by having one rib 14 protrude further than an adjacent rib 14 on the same frame side 11 by a different length or height.

Additional advantages and modifications will readily occur to those skilled in the art. Therefore, the invention in its broader aspects is not limited to the specific details and representative devices that are shown and described herein. Accordingly, various modifications may be made without departing from the spirit and scope of the general inventive concept as defined by the appended claims and their equivalents.

German Patent Application No. 196 44 159.5, filed 24 Oct. 1996, is hereby incorporated by reference in its entirety.

What is claimed is:

1. A unit for conditioning air in a motor vehicle, comprising:

a housing with at least one receptacle;

at least one of a heater and an evaporator supported in the housing;

an inlet opening for receiving air;

an outlet opening for discharging conditioned air;

at least one duct arranged between the inlet and outlet openings;

at least one air control element for regulating air flow through the at least one duct, the at least one air control element including an installation frame supporting a plurality of louvers; and the installation frame comprising at least one frame side having a profile for positive-locking engagement with respect to the housing receptacle.

2. The unit as claimed in claim 1, wherein each frame side profile comprises at least one rib protruding from the frame side and extending in a longitudinal direction of the frame side.

3. The unit as claimed in claim 2, wherein each frame side profile comprises two ribs, the two ribs diverging in the longitudinal direction of the frame side.

4. The unit as claimed in claim 3, wherein the two ribs diverge symmetrically with respect to a longitudinal center axis of the frame side.

5. The unit as claimed in claim 3, wherein the housing receptacle profile comprises a central protrusion having side flanks diverging in an insertion direction of the installation frame with respect to the housing receptacle, the side flanks being spaced apart from one another such that, in the installed state, inner faces of the two ribs of the installation frame rest against the side flanks.

6. The unit as claimed in claim 3, wherein the housing receptacle profile comprises a central depression having side flanks converging in an insertion direction of the installation frame with respect to the housing receptacle, the side flanks being spaced apart from one another such that, in the installed state, outer faces of the two ribs of the installation frame rest against the side flanks.

7. The unit as claimed in claim 1, wherein the housing receptacle has a profile which corresponds to the profile of the at least one installation frame side.

8. The unit as claimed in claim 1, wherein the installation frame comprises two pairs of complimentary opposite frame sides.

9. The unit as claimed in claim 3, wherein transverse spacing between the two ribs on a first frame side differs with respect to transverse spacing between the two ribs on a second frame side.

10. The unit as claimed in claim 2, wherein each frame side profile comprises at least one sloping surface adjoining the at least one rib, the surface sloping downward in an inserting direction.

11. The unit as claimed in claim 10, wherein the surface slopes downward in a diverging direction of two ribs.

12. The unit as claimed in claim 10, wherein two surfaces slope upward in a diverging direction of two ribs.

13. The unit as claimed in claim 10, wherein the surface slope has about a 0.5° grade.

14. The unit as claimed in claim 2, wherein the at least one rib has a constant thickness.

15. The unit as claimed in claim 2, wherein the at least one rib comprises a central region coated with an elastic material.

16. The unit as claimed in claim 15, wherein the elastic material is an elastomeric polymer material.

17. The unit as claimed in claim 3, wherein a first of the two ribs protrudes beyond a second of the two ribs in a corner region of the installation frame.

* * * * *